United States Patent [19]
Bankoski, Jr.

[11] 3,982,228
[45] Sept. 21, 1976

[54] PROGRAMMABLE CONTROLLER

[75] Inventor: Vincent W. Bankoski, Jr., Newark, Del.

[73] Assignee: E. I. DuPont de Nemours and Company, Wilmington, Del.

[22] Filed: Aug. 7, 1975

[21] Appl. No.: 602,752

[52] U.S. Cl. .................... 340/172.5; 340/174 AB; 340/174 BC
[51] Int. Cl.² .................... G05B 19/02; G06F 1/00; G11C 11/06
[58] Field of Search ................ 340/172.5, 174 BC

[56] References Cited
UNITED STATES PATENTS

| | | | |
|---|---|---|---|
| 3,569,947 | 3/1971 | Radus | 340/174 BC |
| 3,827,030 | 7/1974 | Seipp | 340/172.5 |
| 3,849,765 | 11/1974 | Hamano | 340/172.5 |

*Primary Examiner*—Raulfe B. Zache

[57] ABSTRACT

A controller decodes a program input. Read only memory channels are selected using patchcords. The selected memory channels are selectively linked to the memory cores by a flip-top core which can be readily opened by a strap arrangement to permit changes in the linkages.

10 Claims, 9 Drawing Figures

Fig. 2.

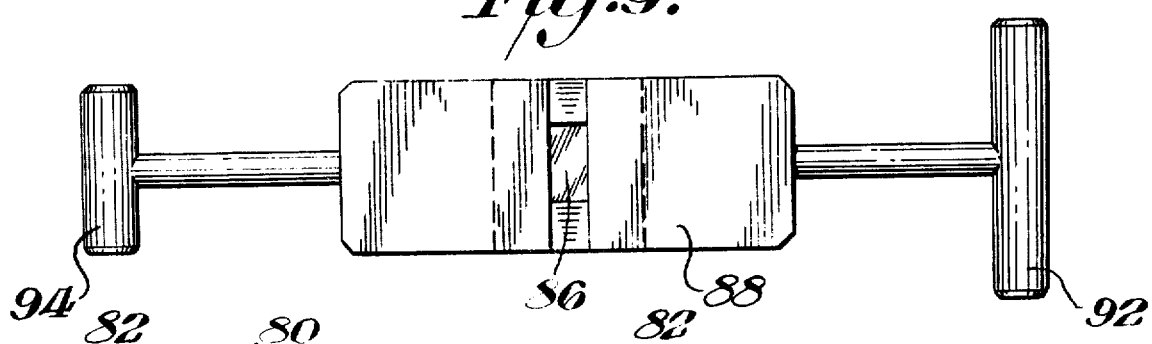
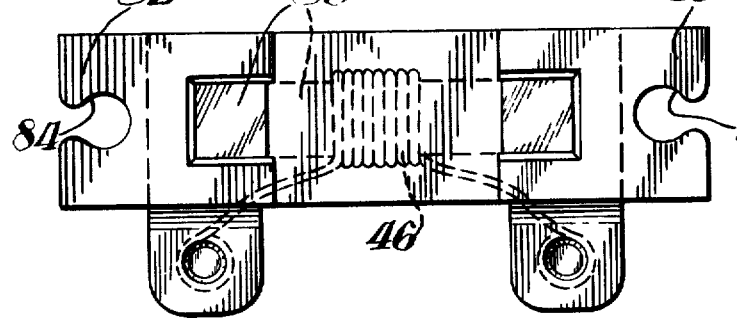
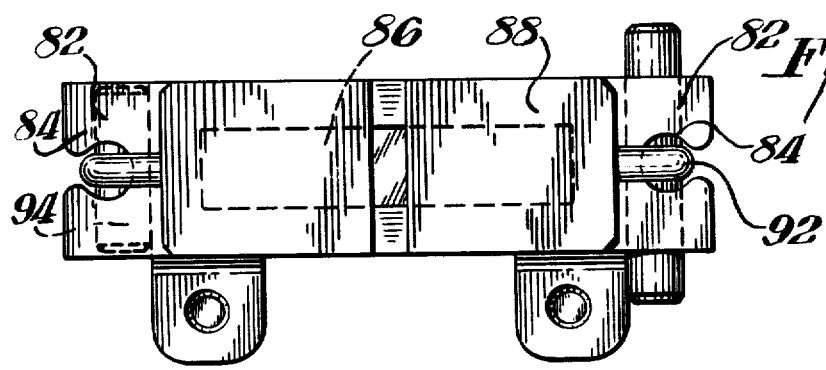
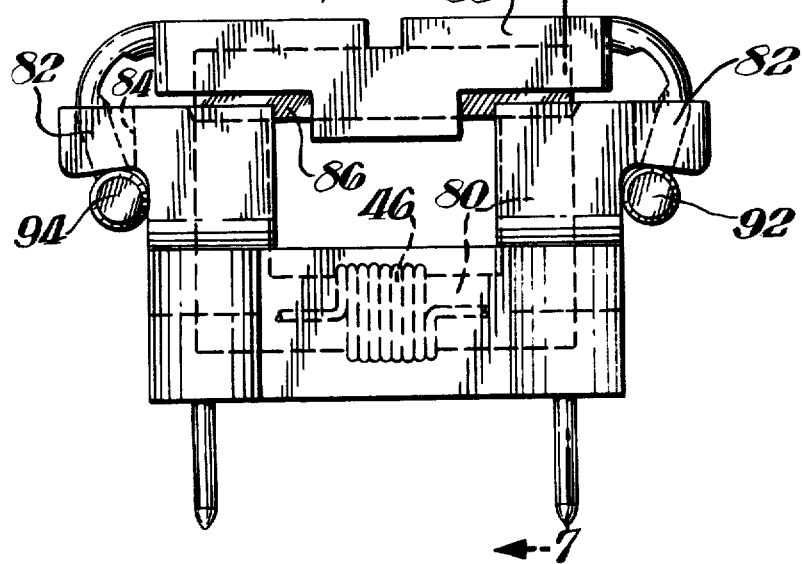
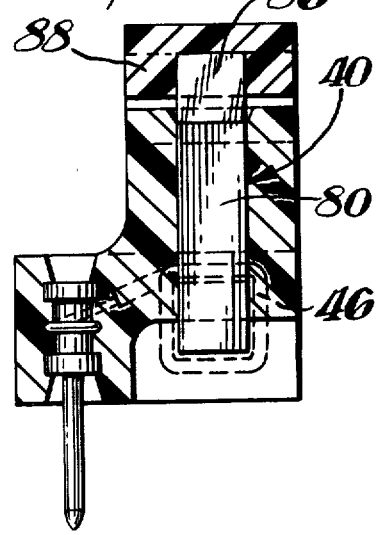

PROGRAMMABLE CONTROLLER

BACKGROUND OF THE INVENTION

This invention relates to a programmable controller and, more particularly, to a controller in which different memory channels can be variously programmed.

Many systems, including processes, instruments, machines and the like, have been automated to the extent that they will automatically operate according to an input program. Such program may include various routines and subroutines or sequences. These routines and sub-routines are often controlled by a memory, typically a read only memory. One problem encountered with such systems is that it is somewhat difficult and time consuming to change or vary the various subroutines.

One instrumentation system using a read only memory (ROM) is that described in U.S. Pat. No. 3,770,382 issued Nov. 6, 1973 to the same assignee as the subject invention. This patent describes an automatic clinical analyzer system in which the reagents for each test are contained in an analytical pack or plastic envelope which also serves as a reaction chamber and cuvette for a photometric analysis. Certain pack types may contain chromatographic columns to remove specific constituents. In any event a separate pack is used for each test performed on a sample. Each pack contains a digital code which is used to program the analyzer. The analyzer is programmed by inserting the appropriate packs containing the desired test indicia behind each sample cup in the input to the analyzer. The analyzer then automatically injects the proper amount of sample and diluent into each pack in succession, mixes the reagents, waits a pre-set length of time for the reaction to take place, forms an optical cell within the transparent pack walls and measures the reaction photometrically. These operations are controlled and monitored by a builtl-in, solid state, special purpose computer, and are performed under precisely regulated conditions. The heart of this computer is the hard wired ROM.

Since there are a very large number of tests which can be performed on a given sample, it is desirable that the computer be readily and easily programmable by the user such that processing of the packs may be varied to perform one or more of the many different tests on each sample.

Accordingly, it is an object of this invention to provide an improved programmable controller.

Another object of this invention is to provide an improved controller which can be programmed readily by the use of a read only memory having magnetic cores which can be selected by the user thereby to vary the program.

A further object of this invention is to provide an improved read only memory that is stable, of high reliability, and requires no power.

SUMMARY OF THE INVENTION

In accordance with this invention a controller for modifying various routines and sub-routines of a process is operated in accordance with an input program. The controller has mechanisms for effecting said routines and sub-routines, logic circuitry responsive to digital input signals for controlling the mechanisms and a programmer responsive to the input program for generating the digital signals. The controller is made readily programmable by the use of a read only memory having a plurality of cores each having secondary windings coupled to the logic circuitry for providing said digital signals, a plurality of primary windings each adapted to be selectively energized in accordance with said input program, and means to magnetically link selected ones of said cores with the selected said primary windings.

In a particularly preferred embodiment the memory cores are formed of two pieces of a ferrite material one of which is U-shaped and the other of which forms a cross bar linking the open ends of the one piece. The one piece of ferrite is partially encapsulated with a jacket or housing having tabs contiguous said open ends while the other piece is secured to the one piece by a locking strap which engages the tabs. The locking strap facilitates the easy opening of a core such that various primary windings may be linked to a core.

In a further preferred embodiment, patch cords are used for selectively interconnecting the plural outputs to the primary windings such that fewer primary windings need be used.

Programming is accomplished simply by linking or not linking a primary winding through a given core to provide a binary one or zero decision.

BRIEF DESCRIPTION OF THE DRAWINGS

Further advantages and features of this invention will become apparent upon consideration of the following description wherein:

FIG. 5 is an elevation view of flip-top core fully encapsulated in accordance with this invention;

FIG. 6 is a plan view of the flip-top core;

FIG. 7 is an end elevation view in cross-section of the flip-top core;

FIG. 8 is a bottom view of the flip-top core; and

FIG. 9 is a representation of the strap that is used to hold the core top to the core.

DESCRIPTION OF THE PREFERRED EMBODIMENT

Figure 1:
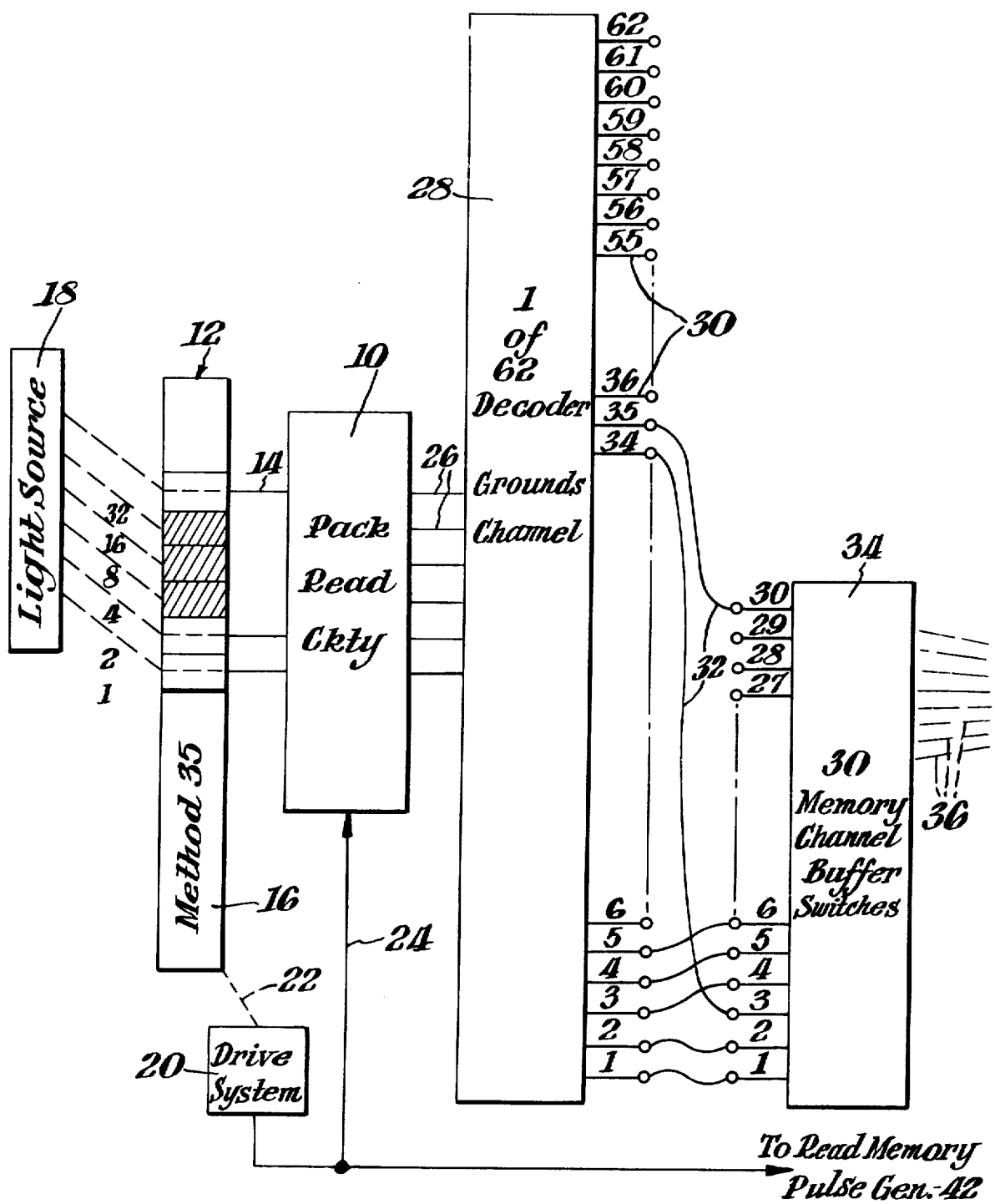
FIGS. 1 and 2 are partial block and partial schematic diagrams of a process control system constructed in accordance with a preferred embodiment of this invention.
Figure 2:
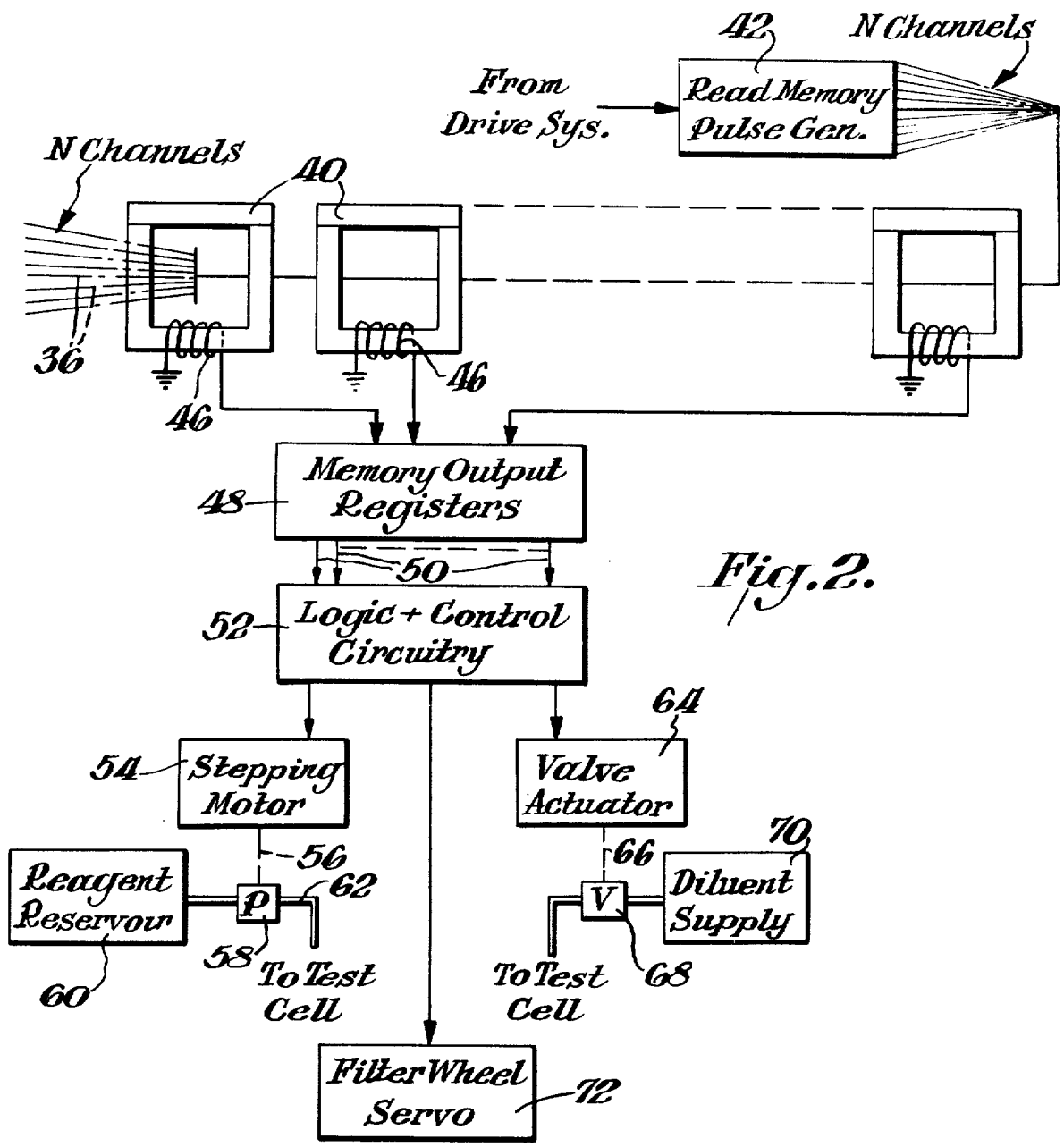
Figures 3, 4:
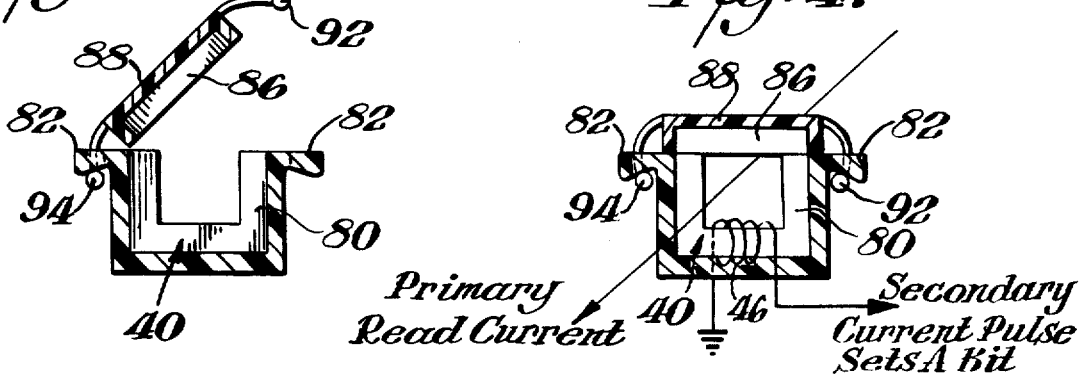
FIG. 3 is a side elevation view in cross section of a flip-top core used in the system of FIG. 1, constructed in accordance with this invention, in an open position.
FIG. 4 is a cross-sectional side elevation view of the flip-top core depicted in FIG. 3 in a closed position and illustrating the core's secondary winding.

There is seen by reference to FIGS. 1 and 2 a block diagram, partially in schematic form, of a process controller capable of controlling a process. By way of example, the process is depicted as one used to test samples in the automatic clinical analyzer described in said U.S. Pat. NO. 3,770,382. It is to be understood however that this invention is not limited to use therewith, but rather may be used in the control of any process.

As is described in said patent, once the sample container, properly identified and containing the sample fluid under test, is placed in the input of the analyzer, followed by the test packs, each containing a particular test instruction and the necessary reagents, the instrument will automatically perform the proper operational steps. This is accomplished by an internal system of control logic and method switching. The control logic directs the operation of the pack handling system, the filling station, the breaker-mixers, the photometer, the printer, the fluid metering system, the pack transport, and the analog/digital converter associated with read out. The logic sequencing is accomplished by a series of switches and photo cells which detect the component movement, or by internal timers which operate from a clock generator. The method switching provides a means for identifying the type of test pack being processed, and of specifying the variables required for the tests. Logic sequencing takes place at every step throughout the instrument. Method switching takes place at the filling station and at the photometer. The logic sequence circuit programs the operation of the instrument with reference to the time that the test pack and sample container remain at each station and the order in which the machine is to perform its functions.

Thus at the filling station a photo reader 10, aided by a translator, identifies the test pack 12 by decoding the identification marks 14 on the header 16. By way of illustration this particular method is designated method number 35. Alternatively, of course, the reader can be a magnetic or mechanical reader but in this instance photo cells are activated by a light source 18 reflected through the dark and light spaces 14 on the header. These light and dark signals are detected by the photo reader 10. In this instance six binary digits are illustrated, giving the decoder the capability of decoding 64 different tests. Greater or lesser number of tests may be decoded as desired simply by increasing the binary bits in the test pack.

The various test packs 12 are processed through this system by a drive system 20 operating through a mechanical linkage depicted by the dashed line 22 which in actuality may be a chain belt drive to sequence the pack from station to station for the different operations and tests to be run thereon. An electrical output signal from the drive system 20 is passed through the line 24 to the photo reader 10 to actuate its circuitry at the proper time. The resulting output signals on the output lines 26 from the photo reader are passed to a decoder 28. The function of the decoder, which may be any conventional logic circuitry, is to select one of a plurality of output lines (in this instance, 62 are illustrated) to designate one method; i.e., in this case method 35. The output lines 30 of the decoder 28 are coupled using patch cords 32 to the input of buffer switches 34 which are used to enable or complete a circuit to ground for one of a plurality of memory read wires. These read wires will be described as lacing lines 36. In this instance 30 lacing lines are illustrated, each of which corresponds to a different method that may be used to run a particular test. For a particular test, the instrument determines, for example, the amount and type of buffer solution, if any, to be drawn into the chamber of the pump, the amount of sample fluid to be drawn into the probe, the amount of sample-buffer solution to be injected into the test pack, and whether this solution should be injected directly into the reaction chamber of the test pack or into the reaction chamber through the separation column. Having made this determination, the logic control circuit controls the instrument to perform the necessary steps as will be described.

To permit this determination, the lacing lines 36 are selectively laced, passed through, or magnetically linked with one or more of a plurality of magnetic cores 40. The cores may be conventional ferrite cores such as those typically used in the computer memories. Depending upon whether the lacing wires pass through a core or not, a read memory pulse generator 42, which is timed by the drive system 22, is adapted to apply a memory read pulse to each of the lines 36. Since only one of these lines in enabled, i.e., its circuit completed to ground, at a time by the buffer switches 34, only the cores 40 linked by that one line will be pulsed. Each of the cores 40 has a secondary winding 46 permanently wound thereon. One end of the secondary winding is coupled to ground, the other is coupled to provide an input to the memory output registers 48.

The memory output registers 48 provide a plurality of binary output signals on output lines 50 which are passed to logic and control circuitry 52 which operate the various elements of the analyzer. For example, the logic and control circuitry 52 may actuate a stepping motor 54 which, operating through a linkage 56, controls a pump 58 which supplies a reagent from a reagent reservoir 60 through an output line 62 to the test cell in the test pack.

Another output line of the logic and control circuitry 52 may control a valve actuator 64 which operates through a mechanical linkage 66 to control a valve 68. The valve 68 controls the fluid from a diluent supply 70 to the test cells. A filter wheel servo 72 may also be controlled by the logic and control circuitry 52 as may the various other elements of the analyzer described or, for that matter, any other test or process or system which is to be controlled. Since the various features to be controlled are basically well known and a mechanism for the control thereof, also known, it is not believed necessary to go into a detailed description of the various and myriads of applications or mechanical actuators which may be controlled by the circuitry 52.

It suffices to say that the memory output registers 48 may be of conventional design and for that matter may be integrated circuits. Their function is to decode the output signals derived from the secondaries 46 and in response to provide various logic levels on the output lines 50 which are decoded by the logic and control circuit 52. The latter circuitry 52 is also well known and may be integrated circuits which perform the necessary decoding logic to provide the necessary output control signals.

In accordance with the preferred embodiment of this invention, the several cores 40, which may be considered as the cores of a read only memory, are selectively actuated by the N-channels 36 which are 'aced or wired to magnetically link the several cores by the user. Hence it may be said that the user programs the instrument by his selection of which cores shall be linked by which of the channel wires 36. If a linkage occurs by a channel wire 36, when that wire receives a read memory pulse 42 the secondary winding 46 for that core will provide a binary output signal to the decoding registers 48, otherwise, no output signal is provided. Hence the binary one-zero decision is achieved. These cores are constructed in accordance with this invention as illustrated in FIG. 3 thru 9. Each core preferably is comprised of a U-shaped magnetic ferrite material 80 which shows a secondary winding 46 wound around the bottom portion of the U. The exterior of this U-shaped member, including the secondary winding 46 if desired, is encapsulated with a suitable plastic material such as polypropylene and is formed with a tab 82 on either side. Each tab 82 has a central slot 84 formed therein for reasons which will be described. To complete the core, a straight top piece of magnetic ferrite material 86 is employed to link the top ends of the U-shaped core member 80. In turn the upper portion of the straight piece is partially encapsulated by a plastic material of straplike configuration 88. The central portion of the straplike configuration or cap provides a housing for the bar 86. The cap 88 preferably may be formed of a elastomeric material such as polyester elastomer sold under the trademark Hytrel by E.I. du Pont de Nemours & Co., Wilmington, Deleware. Each end of the cap 88 is provided with a T-shaped end piece 92 and 94 seen perhaps most clearly in FIG. 8. The end piece 94 is adapted to engage the slot of one of the tabs 82 whereas the other end piece 92 which is also T-shaped, but with a longer bar portion, is adapted to engage the remaining end piece tab 82. The other end piece 92 is employed to permit the ends of the T-bar 92 to be gripped more easily for removal. In this manner the core may be readily opened simply by removing the other T-bar end piece 92 from the slot. This is easily accomplished since the cap material is elastomeric. The material can be stretched out from the slot and the encapsulated top piece lifted to open the core. For this reason it may be designated as a flip-top core 40.

Thus the N-channel 36 of the read only memory comprising the several cores 40 may be used to program the processing of the packs. Because of this invention, the various channels are not limited to specific chemistries or specific processes. Programming is accomplished simply by lacing or stringing one of the channel wires 36 into the open core and re-engaging the latch 92 in the slot 82. Each channel can provide all the required information for a particular test or sub-routine.

In operation the user places the several packs to be processed in the machine and by use of the patch cords 32 selects which of the various methods are to be coupled to the existing memory channels. The channel wires 36 are then threaded or laced through the desired open cores to provide the necessary function controlling the reagent amounts, filter wheels used, diluents employed, etc., and again the several cores closed. The flip-top core is a ready means by which this programming can be changed easily and quickly simply by relacing of one or more of the wires. The use of cores provides a memory which in non-volatile, has a high noise immunity, a high reliability and is quite stable.

It should be emphasized that the invention is not limited to the analyzer described, but may have application to any process control system in which it is necessary to re-program routines and sub-routines quickly and easily. This is accomplished in accordance with this invention both by the use of patch cords and by the use of flip-top cores to provide the user with great versatility and simplicity.

I claim:

1. In a process controller for controlling various routines and sub-routines of a process operated in accordance with different program inputs, said controller having mechanisms for effecting said sub-routines, logic circuitry responsive to digital input signals for controlling said mechanisms, and a programmer responsive to said program inputs for generating said digital signals thereby to control said routines and sub-routines, the improvement wherein said programmer comprises:

a read only memory having a plurality of cores each having a secondary winding coupled to said logic circuitry for providing said digital input signals, a plurality of primary winding each adapted to be selectively energized in accordance with said program inputs, and mechanical means to magnetically link selected ones of said cores with selected ones of said primary windings.

2. A controller according to claim 1 wherein each said core has a magnetic circuit adapted to be opened to facilitate linking said core with one of said primary windings.

3. A controller according to claim 1 wherein each said core is formed of two pieces of a ferrite.

4. A controller according to claim 3 wherein one of said pieces is U-shaped and the other of said pieces forms a cross bar magnetically linking the open ends of said one piece.

5. A controller according to claim 4 wherein said one piece is partially encapsulated with a jacket having tabs contiguous said open ends and said other piece is secured to said one piece by a locking strap which engages said tabs.

6. A controller according to claim 5 wherein said tabs are slotted and said locking strap is formed of an elastomeric material having T-shaped ends adapted to engage said slotted tabs, thereby to facilitate opening said cores.

7. A controller according to claim 6 which includes a decoder having plural outputs, said decoder being responsive to said program inputs for selectively energizing said plural outputs, and a plurality of patch cords for selectively interconnecting said plural outputs to said primary windings.

8. A controller according to claim 7 which includes a plurality of buffer switches each adapted to be linked to said plural outputs by said patch cords and to complete a circuit for only one of said primary windings according to said program input, and a pulse generating means for simultaneously applying a read pulse to each of said primary windings, thereby to transmit said read pulse through said one primary winding and magnetically energize said selected core's secondary windings.

9. A controller according to claim 1 which includes a decoder having plural outputs, said decoder being responsive to said program inputs for selectively energizing said plural outputs, and a plurality of patch cords for selectively interconnecting said plural outputs to said primary windings.

10. A controller according to claim 9 which includes a plurality of buffer switches each adapted to be linked to said plural outputs by said patch cords and to complete a circuit for only one of said primary windings according to said program input, and a pulse generating means for simulatineously applying a read pulse to each of said primary windings, thereby to transmit said read pulse through said one primary winding and magnetically energize said selected cores secondary windings.

* * * * *